US008978731B2

(12) United States Patent
Wu

(10) Patent No.: US 8,978,731 B2
(45) Date of Patent: Mar. 17, 2015

(54) STATIONERY TOOL WITH A PUSHBUTTON HAVING A PUSH-PROOF CAPABILITY

(75) Inventor: Chien-Lung Wu, Chang Hua (TW)

(73) Assignee: SDI Corporation, Chang Hua (TW)

( * ) Notice: Subject to any disclaimer, the term of this patent is extended or adjusted under 35 U.S.C. 154(b) by 244 days.

(21) Appl. No.: 13/593,714

(22) Filed: Aug. 24, 2012

(65) Prior Publication Data

US 2013/0236230 A1 Sep. 12, 2013

(30) Foreign Application Priority Data

Mar. 8, 2012 (TW) ............................. 101107876 A

(51) Int. Cl.

*B32B 37/26* (2006.01)
*B26F 3/02* (2006.01)
*B43L 19/00* (2006.01)
*B43K 24/08* (2006.01)
*B65H 37/00* (2006.01)

(52) U.S. Cl.

CPC ............. *B43K 24/08* (2013.01); *B43L 19/0075* (2013.01); *B65H 37/007* (2013.01)
USPC ........... 156/577; 156/574; 401/110; 401/111; 401/112; 401/116

(58) Field of Classification Search

CPC ..................................................... B65H 37/007
USPC ................. 401/110, 111, 112, 113, 114, 116; 156/574, 577
See application file for complete search history.

(56) References Cited

U.S. PATENT DOCUMENTS 3,064,624 A * 11/1962 Hechtle ......................... 401/110
3,070,069 A * 12/1962 Ruden ........................... 401/111
(Continued)

FOREIGN PATENT DOCUMENTS

DE 101 60 686 A1 6/2003
EP 1 806 308 A1 7/2007
(Continued)

OTHER PUBLICATIONS

European Search Report on European Patent Application No. EP 12 18 1917.
(Continued)

*Primary Examiner* — Mark A Osele
(74) *Attorney, Agent, or Firm* — Charles E. Baxley

(57) ABSTRACT

A stationery tool has a body, a pushbutton, a working element, and a push-proof device. The pushbutton is pushably and rotatably mounted on an end of the body. The working element is mounted in the body and is connected to and driven by the pushbutton. The push-proof device is mounted between the body and the pushbutton and has a blocking protrusion and a blocking segment. The blocking protrusion is disposed on the pushbutton. The blocking segment is disposed on the body, selectively abuts the blocking protrusion and has a passage defined in the blocking segment to allow the blocking protrusion to pass the blocking segment. Accordingly, a push-proof capability is provided to the pushbutton to prevent the working element from extending out of the body unintentionally.

20 Claims, 11 Drawing Sheets

(56) References Cited

U.S. PATENT DOCUMENTS

| | | | | | |
|---|---|---|---|---|---|
| 3,073,286 | A * | 1/1963 | Martin et al. | 401/114 |
| 3,273,541 | A * | 9/1966 | Thurman et al. | 401/111 |
| 3,464,774 | A * | 9/1969 | Vetter | 401/110 |
| 3,792,931 | A * | 2/1974 | Ganz | 401/109 |
| 4,022,535 | A * | 5/1977 | Ritter | 401/32 |
| 4,786,197 | A * | 11/1988 | Koeln et al. | 401/116 |
| 5,145,272 | A * | 9/1992 | Keil | 401/112 |
| 7,654,297 | B2 * | 2/2010 | Wu | 156/577 |
| 7,861,758 | B2 * | 1/2011 | Sun | 156/574 |
| 8,146,644 | B2 * | 4/2012 | Wu | 156/523 |
| 8,373,682 | B2 * | 2/2013 | Liang | 345/179 |
| 8,505,606 | B2 * | 8/2013 | Wu | 156/577 |
| 8,573,277 | B2 * | 11/2013 | Fueki | 156/538 |
| 2006/0084558 | A1 * | 4/2006 | Watanabe | 483/59 |
| 2009/0229763 | A1 * | 9/2009 | Lin | 156/577 |
| 2010/0108269 | A1 * | 5/2010 | You | 156/577 |
| 2012/0118509 | A1 * | 5/2012 | Fueki | 156/577 |

FOREIGN PATENT DOCUMENTS

| | | | |
|---|---|---|---|
| JP | 2004 130746 | | 4/2004 |
| WO | WO 2011/070935 | A1 | 6/2011 |
| WO | WO 2011/070938 | A1 | 6/2011 |

OTHER PUBLICATIONS

Annex to European Search Report on European Patent Application No. EP 12 18 1917.
Examination Commmunication on European Patent Application No. EP 12 18 1917.
Brief Explanations of Four of the Documents Cited in the European Search Report on European Patent Application No. 12 18 1917 Considered to be Relevant.

* cited by examiner

STATIONERY TOOL WITH A PUSHBUTTON HAVING A PUSH-PROOF CAPABILITY

BACKGROUND OF THE INVENTION

1. Field of the Invention

The present invention relates to a stationery tool, and more particularly to a stationery tool with a pushbutton having a push-proof capability.

2. Description of Related Art

A stationery tool, such as a correction tape, a thin film dispenser, a writing tool or a rubber, usually has an extension mechanism to push a working element to extend out of a body of the stationery tool. Accordingly, a user can carry out office work, such as thin film coating, writing or error erasing with the extending working element. One kind of conventional extension mechanism comprises a pushbutton to extend or retract a working element out of or into a body of a stationery tool reciprocatingly when the pushbutton is pushed.

However, the conventional pushbutton does not have a push-proof capability, so the conventional pushbutton will be pushed carelessly or unintentionally to cause the working element to extend out of a body arbitrarily. Particularly, a stationery tool having a pushbutton is often put in a briefcase or an outfit pocket, so the working element of the stationery tool may be unintentionally pushed to extend out of the body of the stationery tool due to being compressed. Consequently, the documents in the briefcase or the outfit pocket are easily dirtied to cause inconvenience in use or even irretrievable damage.

To overcome the shortcomings, the present invention tends to provide a stationery tool to mitigate or obviate the aforementioned problems.

SUMMARY OF THE INVENTION

The main objective of the invention is to provide a stationery tool with a pushbutton having a push-proof capability to keep the pushbutton from being pushed unintentionally.

The stationery tool has a body, a pushbutton, a working element, and a push-proof device. The pushbutton is pushably and rotatably mounted on an end of the body. The working element is mounted in the body and is connected to and driven by the pushbutton. The push-proof device is mounted between the body and the pushbutton and has a blocking protrusion and a blocking segment. The blocking protrusion is disposed on the pushbutton. The blocking segment is disposed on the body, selectively abuts the blocking protrusion and has a passage defined in the blocking segment to allow the blocking protrusion to pass.

Accordingly, the pushbutton can be rotated to make the blocking protrusion abut the blocking segment, such that the pushbutton can be kept from being pushed relative to the body and can be kept in a locked condition. Consequently, the working element can be kept from extending out of the body unintentionally to dirty or damage other objects, such that the utility of the stationery tool in accordance with the present is improved.

Other objects, advantages and novel features of the invention will become more apparent from the following detailed description when taken in conjunction with the accompanying drawings.

DETAILED DESCRIPTION OF PREFERRED EMBODIMENT

A stationery tool in accordance with the present invention has a pushbutton having a push-proof capability, may be a writing tool, a rubber or a thin film dispenser and may be any stationery tool having a pushbutton for pushing a working element out of a body for proceeding with office work. The stationery tool comprises a body, a pushbutton, a working element and a push-proof device. The pushbutton is pushably and rotatably mounted on an end of the body. The working element is mounted in the body and is connected to and driven by the pushbutton. When the pushbutton is pushed, the working element extends out of the body to enable a user to proceed with office work. The working element may be a refill, a rubber, a correction tape, a thin film dispensing unit or the like. The body, the pushbutton and the working element may have different shapes, structures and connections and may be conventional, and therefore the detail descriptions about the body, the pushbutton and the working element are omitted. A thin film dispenser serves as a figure example for describing the present invention.

Figure 5:
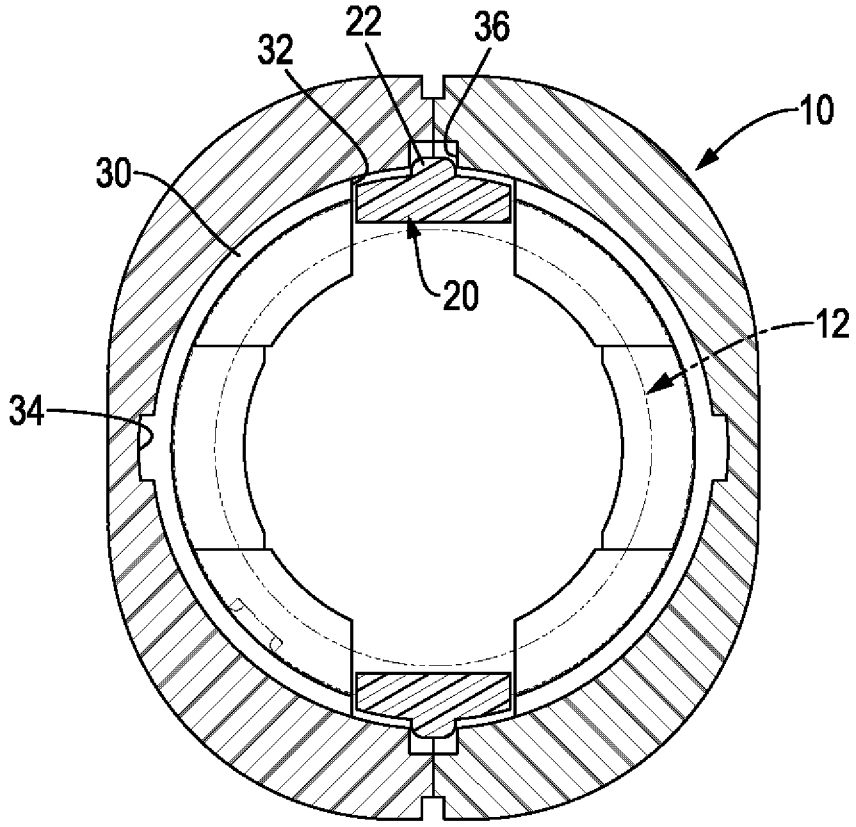
FIG. 5 is an end view in partial section of the stationery tool along line 5-5 in FIG. 4.
Figure 6:
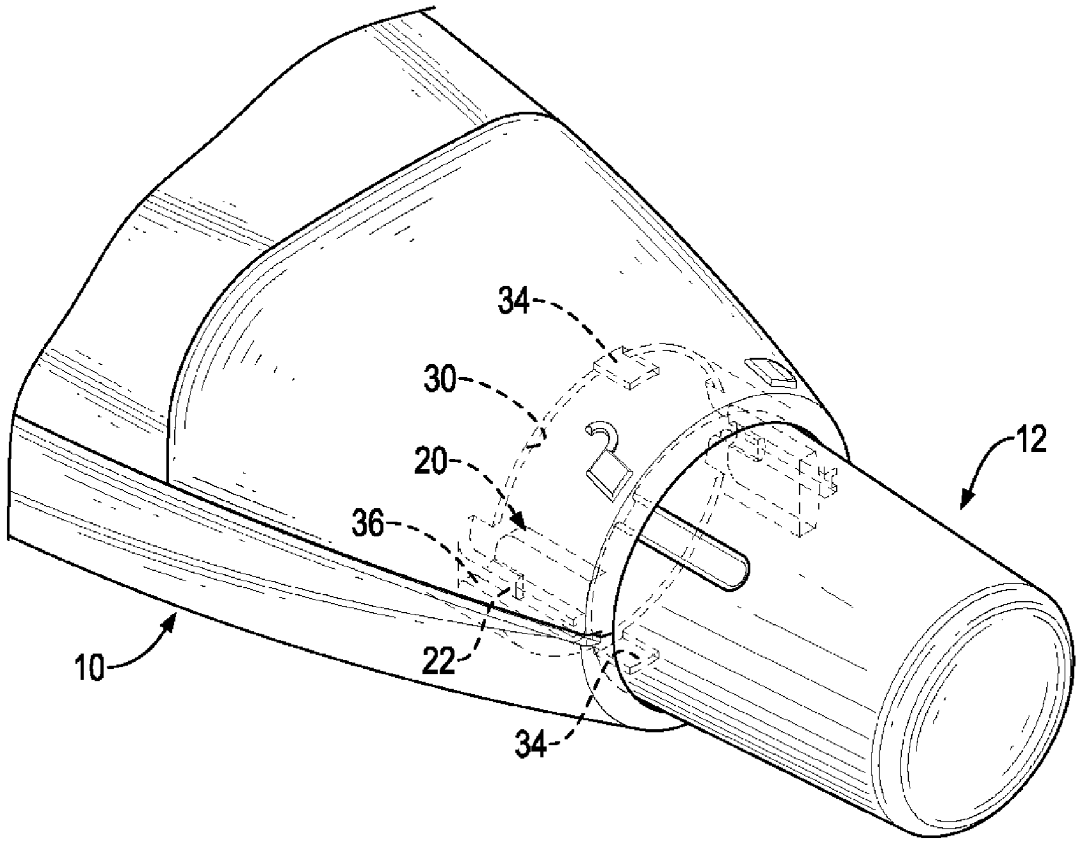
FIG. 6 is an enlarged operational perspective view of the stationery tool in FIG. 1 showing the pushbutton in an unlocked condition.

With reference to FIGS. 1 to 5, the push-proof device is mounted between a body 10 and a pushbutton 12 and comprises a blocking protrusion and a blocking segment 30. The blocking protrusion is formed on the pushbutton 12. The blocking segment 30 is formed on an inner surface of the body 10. The blocking protrusion comprises at least one blocking tab 20, and preferably two blocking tabs 20 are implemented. The blocking tabs 20 are formed respectively on two ends of a diameter of the pushbutton 12. Each blocking tab 20 is axially formed on and protrudes from the pushbutton 12 at an end that extends into the body 10 and has a compressible elasticity relative to the pushbutton 12. Each blocking tab 20 has a positioning rib 22 formed on an outer surface of the blocking tab 20. The blocking segment 30 is formed on the inner surface of the body 10 and comprises a blocking flange being perpendicular to the inner surface of the body 10 and a passage defined in the blocking segment 30 to allow the blocking protrusion to pass. The passage comprises at least one guiding channel 32 defined through the blocking segment 30 and selectively aligning respectively with the at least one blocking tab 20. Preferably, two guiding channels 32 are implemented to fit with the number of the blocking tabs 20 and are spaced from each other at 180° in curvature. In addition, the body 10 may further have at least one positioning groove 34 formed in an inner surface of the body 10. Preferably, two positioning grooves 34 are implemented to fit with the number of the blocking tabs 20 and are formed in the inner surface of the body 10 at positions beside the passage. With reference to FIG. 5, the two positioning grooves 34 are spaced from each other at 180° in curvature, and each positioning groove 34 is spaced from an adjacent one of the guiding channels 32 at 90° in curvature. In addition, the body 10 may further have at least one positioning channel 36 formed in the inner surface of the body 10 and respectively corresponding to the at least one guiding channel 32. Preferably, the at least one positioning channel 36 respectively aligns and communicates with the at least one guiding channel 32. Consequently, the positioning rib 22 on the at least one blocking tab 20 respectively engages the at least one positioning channel 36 when the at least one blocking tab 20 respectively aligns with the at least one guiding channel 32. Preferably, two positioning channels 36 are implemented to fit with the numbers of the blocking tabs 20 and the guiding channels 32.

With such an arrangement, with reference to FIGS. 1, 3, 5 and 6, when the blocking tabs 20 on the pushbutton 12 align respectively with the guiding channels 32 in the body 10, the pushbutton 12 is pushable. When the pushbutton 12 is pushed, the blocking tabs 20 can extend into the guiding channels 32, such that the pushbutton 12 can be pushed to extend into the body 10 and to drive the working element 14 to extend out of the body 10. Consequently, the stationery tool can be applied to proceed with the desired office work. At this time, because the blocking tabs 20 extend respectively into the guiding channels 32, the pushbutton 12 can be kept from rotating relative to the body 10. In addition, before the pushbutton 12 is pushed, the positioning ribs 22 on the blocking tabs 20 respectively engage the positioning channels 36. With the engagement between the positioning ribs 22 and the positioning channels 36, a guiding effect is provided to enable a user to push the pushbutton 12 smoothly, and the pushbutton 12 can be kept from rotating relative to the body 10 arbitrarily. Accordingly, the pushbutton 12 can be kept in the pushable condition stably.

Figure 1:
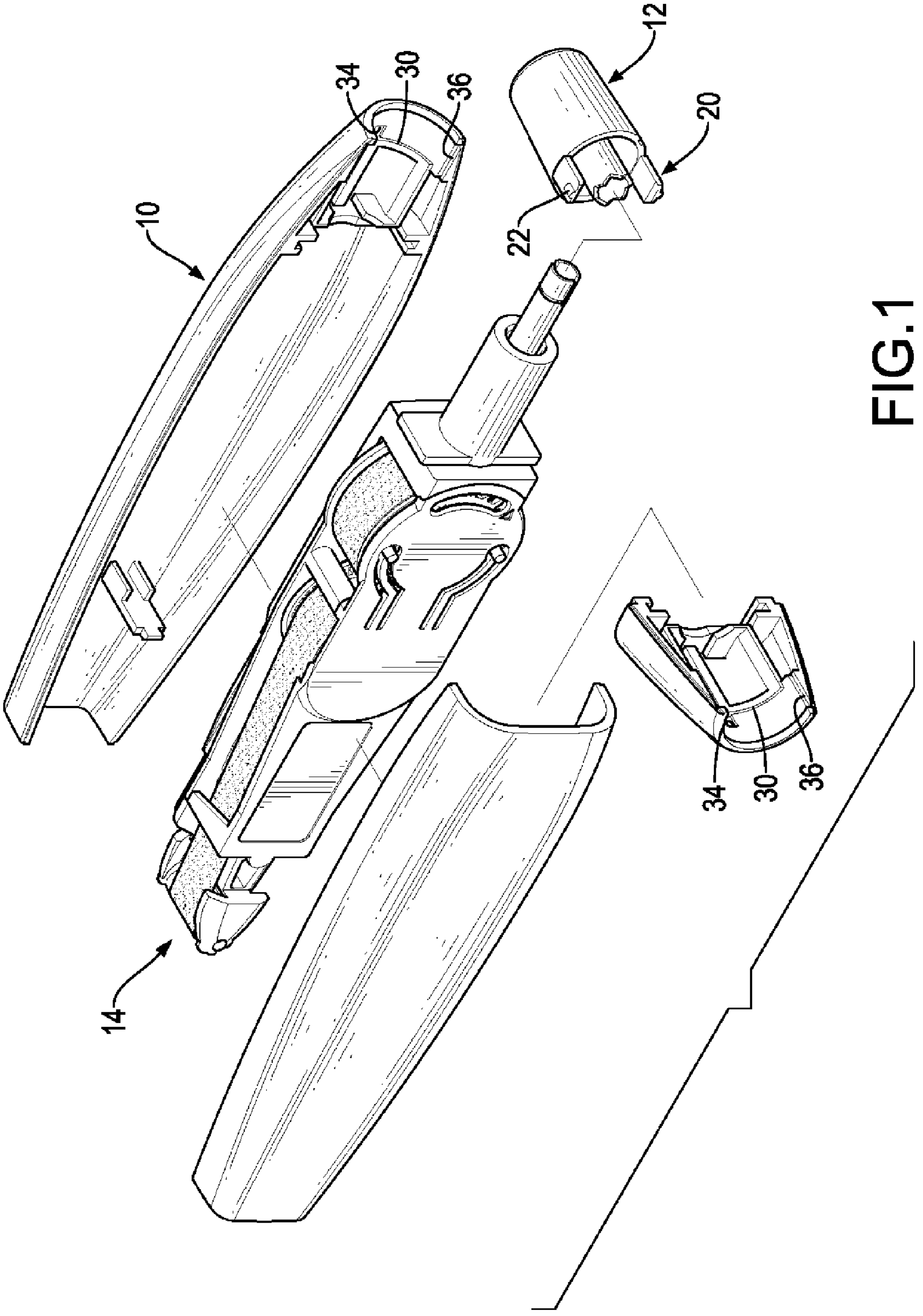
FIG. 1 is an exploded perspective view of a first embodiment of a stationery tool in accordance with the present invention.
Figure 2:
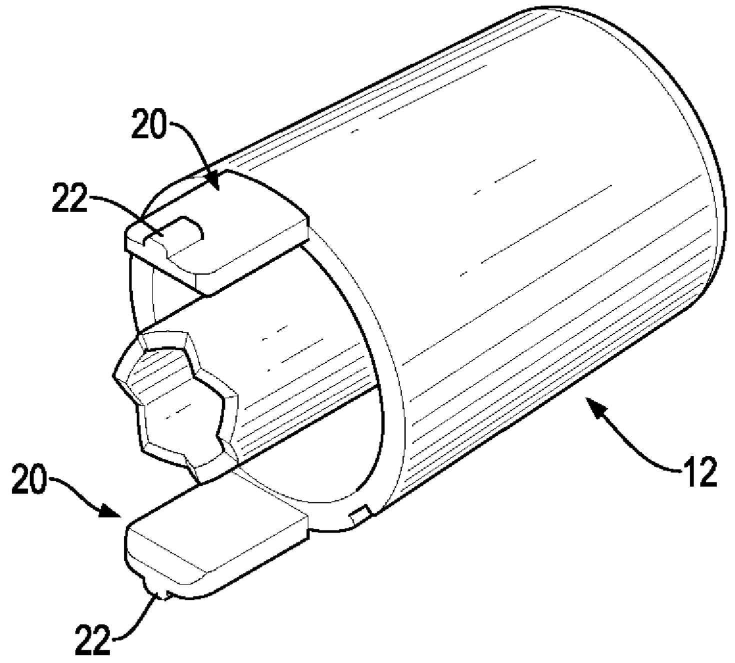
FIG. 2 is an enlarged perspective view of a pushbutton of the stationery tool in FIG. 1.
Figure 3:
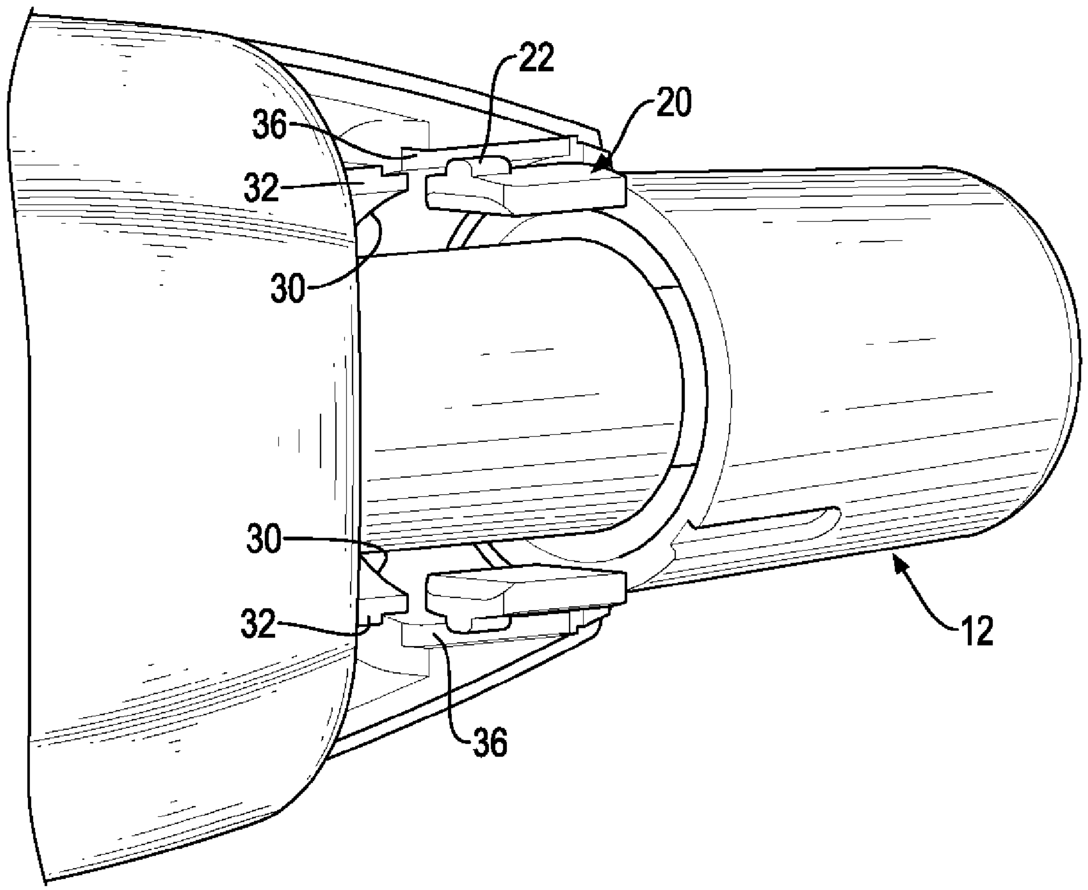
FIG. 3 is an enlarged perspective view in partial section of the stationery tool in FIG. 1.
Figure 4:
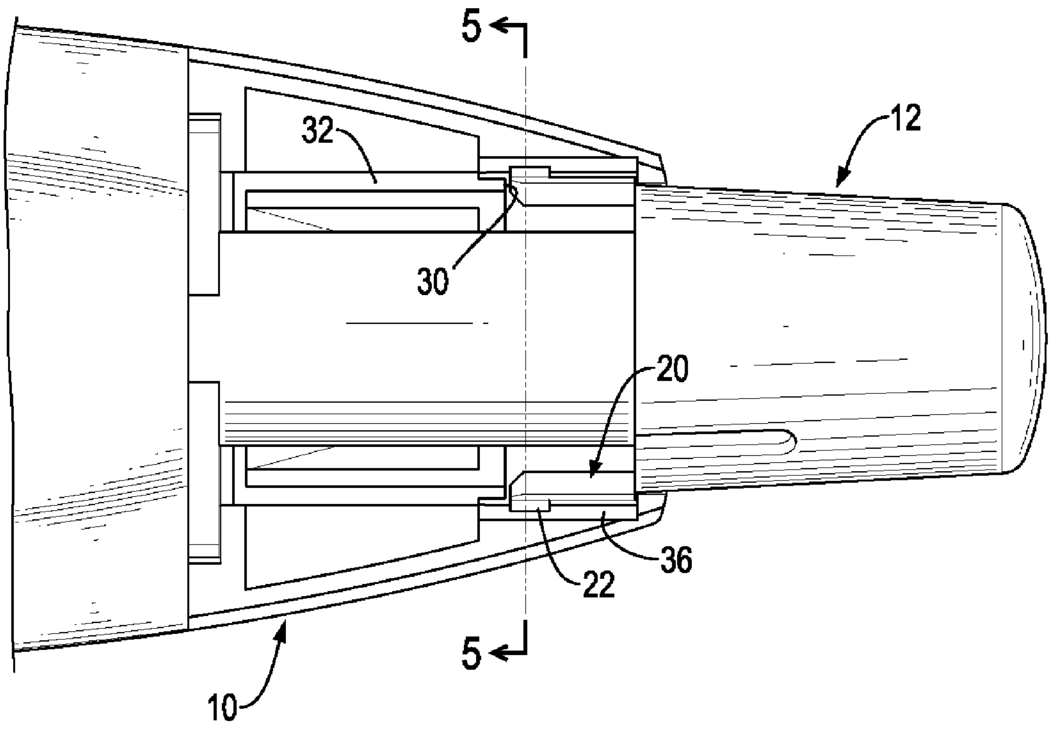
FIG. 4 is an enlarged side view in partial section of the stationery tool in FIG. 1.
Figure 7:
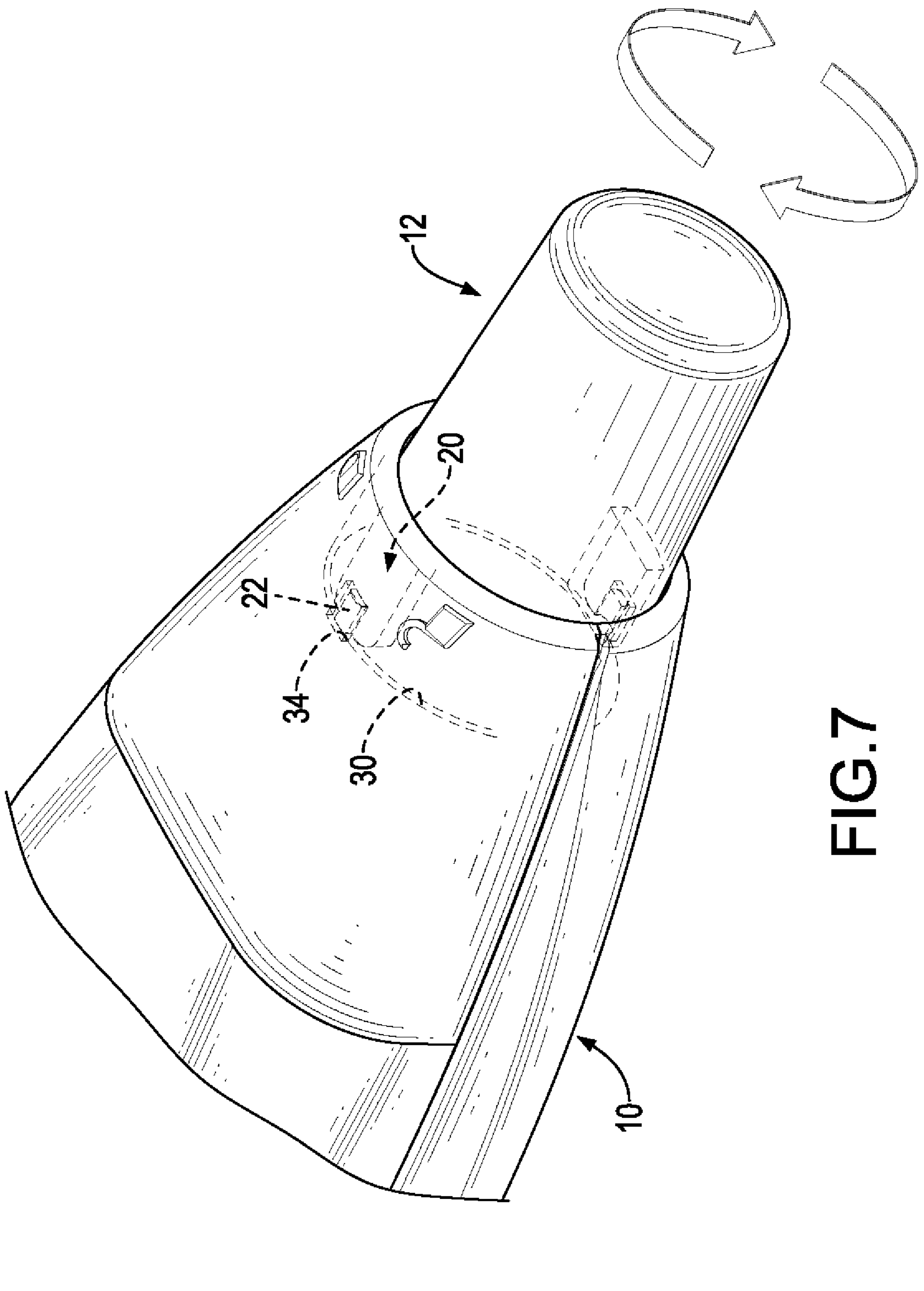
FIG. 7 is an enlarged operational perspective view of the stationery tool in FIG. 1 showing the pushbutton in a locked condition.

To lock the pushbutton 12, with reference to FIGS. 1, 5 and 7, the pushbutton 12 is forced to rotate relative to the body 10, and the positioning ribs 22 are disengaged from the positioning channels 36 with the compressible elasticity of the blocking tabs 20. After the pushbutton 12 is rotated by an angle to make the blocking tabs 20 or the positioning ribs 22 face the blocking segment 30, the pushbutton 12 is not pushable and cannot be pushed to extend into the body 10 due to the abutment between the blocking segment 30 and the blocking tabs 20 or the positioning ribs 22. Consequently, the pushbutton 12 is locked. With the pushbutton 12 being locked, the pushbutton 12 is not pushable and the working element 14 will not extend out of the body 10 unintentionally, thereby preventing the working element 14 from dirtying or damaging other objects.

In addition, when the pushbutton 12 is rotated relative to the body 10 by a predetermined angle, such as 90°, the positioning ribs 22 on the blocking tab 20 will respectively engage the positioning grooves 34 in the body 10. Accordingly, the pushbutton 12 can be held in the locked condition and will not be arbitrarily rotated back to the unlocked condition where the blocking tabs 20 align with the guiding channels 32. Thus, the pushbutton 12 can be prevented from being unlocked unintentionally.

To unlock the pushbutton 12, the pushbutton 12 is rotated in reverse. With the compressible elasticity of the blocking tabs 20, the blocking tabs 20 can be compressed to disengage the positioning ribs 22 on the blocking tabs 20 from the positioning grooves 34 and to make the pushbutton 12 rotatable relative to the body 10. When the pushbutton 12 is rotated to a position where the blocking tabs 20 align with the guiding channels 32, the pushbutton 12 is unlocked and pushable so that the stationery tool is under the operation condition. Alternatively, the pushbutton 12 can be unlocked by rotating the pushbutton 12 continuously in a single direction along which the pushbutton 12 can be rotated to lock.

Figure 8:
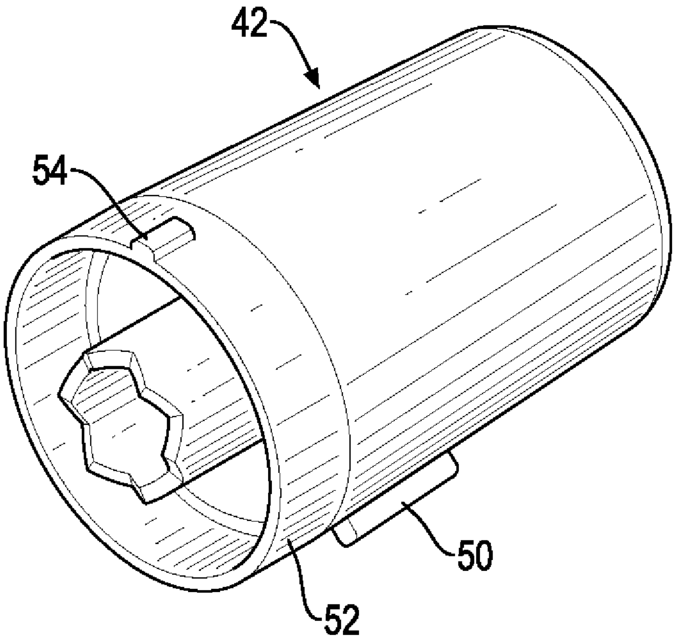
FIG. 8 is a perspective view of a pushbutton of a second embodiment of a stationery tool in accordance with the present invention.
Figure 9:
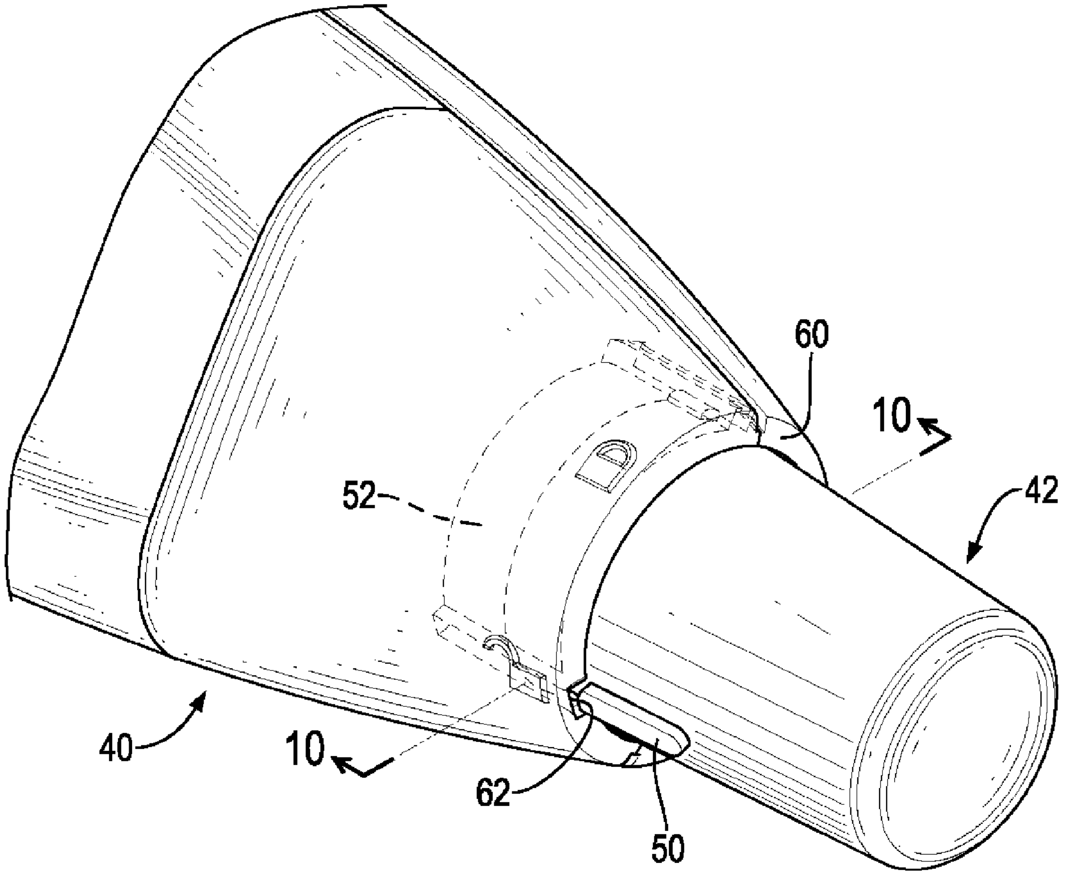
FIG. 9 is an operational perspective view of the second embodiment of the stationery tool in accordance with the present invention showing the pushbutton in an unlocked condition.
Figure 10:
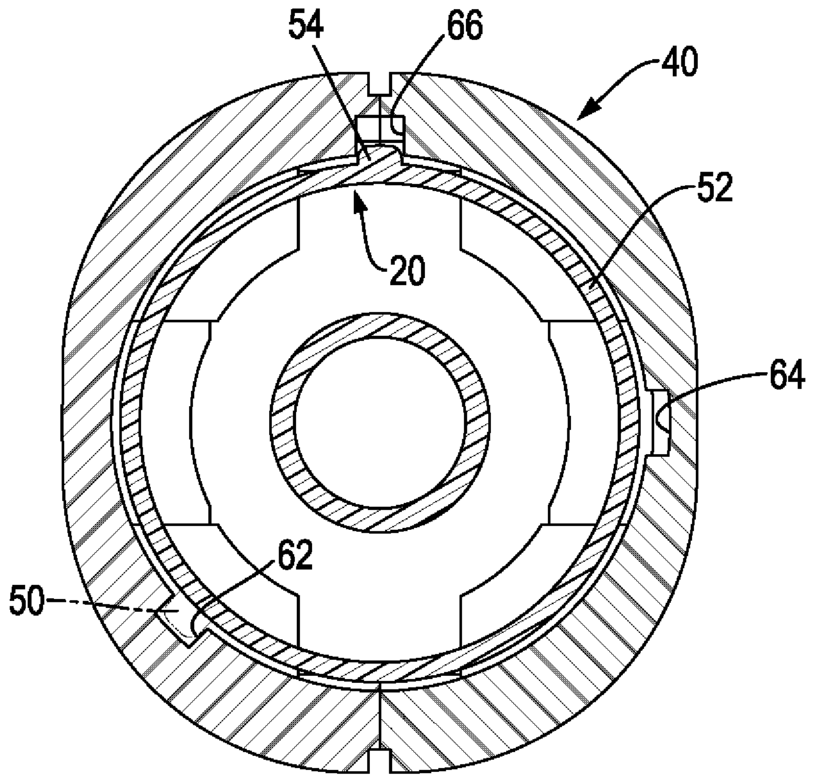
FIG. 10 is a cross sectional end view of the stationery tool along the line 10-10 in FIG. 9 showing the pushbutton in an unlocked condition.

With reference to FIGS. 8 to 10, in the second embodiment of the push-proof device, the blocking protrusion comprises at least one blocking rib 50 formed on and protruding from the outer surface of the pushbutton 42. The blocking segment 60 is formed on the end of the body 40, and a passage is formed through the blocking segment 60 to allow the blocking rib 50 to pass the blocking segment 60 and to extend into the body 40. The passage comprises at least one guiding channel 62 axially defined in the end of and extending into the body 40 and selectively aligning respectively with the at least one blocking rib 50.

With such an arrangement, while the pushbutton 42 is at a position where the blocking rib 50 aligns with the guiding channel 62, the pushbutton 42 is pushable and can be pushed to extend into the body 40. When the pushbutton 42 is pushed, the blocking rib 50 extends into and slides relative to the guiding channel 62 and the working element is driven to extend out of the body 40 to proceed with the desired office work. In addition, the guiding channel 62 can provide a limiting effect to the blocking rib 50 to keep the pushbutton 42 from rotating relative to the body 40.

Figure 11:
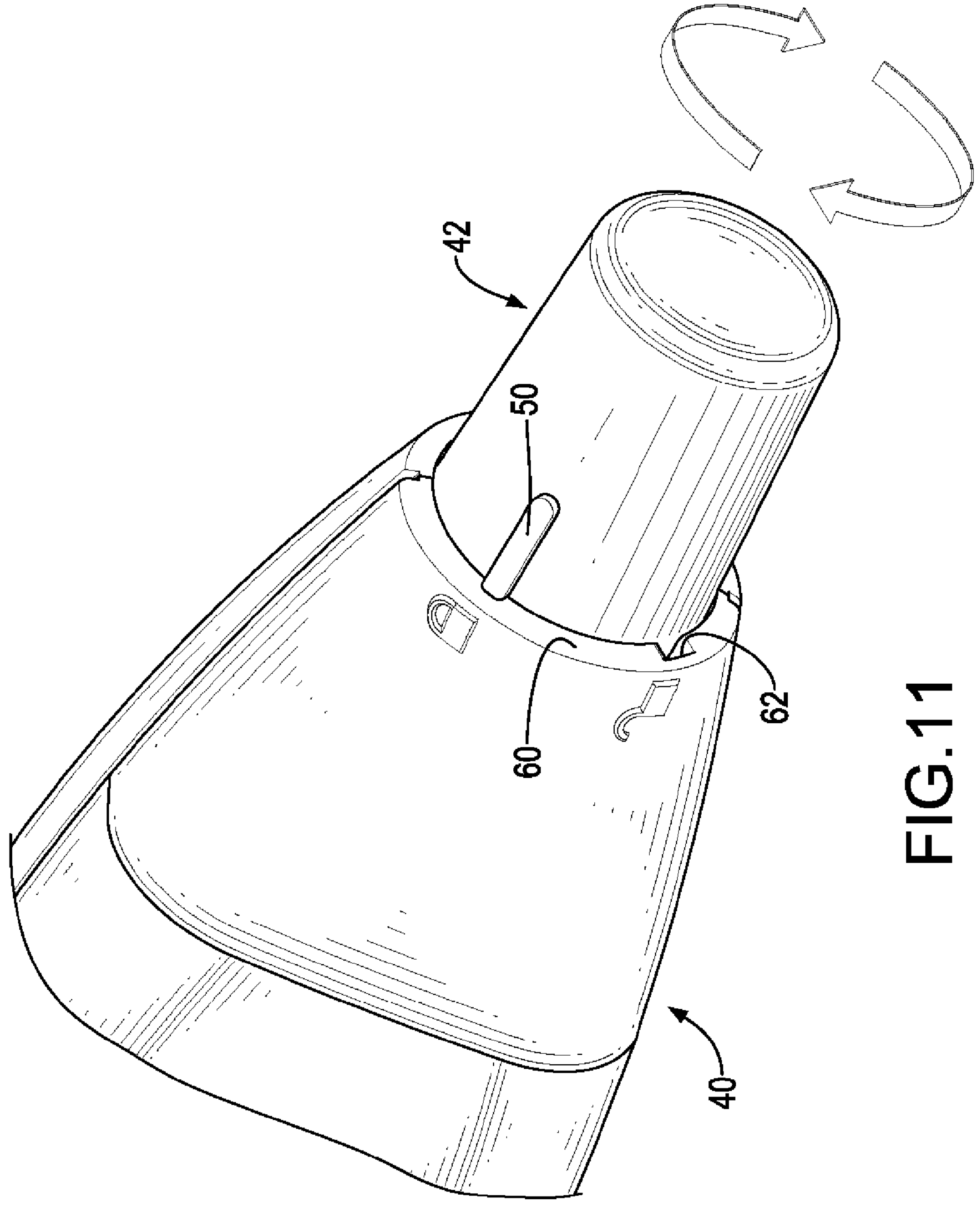
FIG. 11 is an operational perspective view of the second embodiment of the stationery tool in FIG. 9 showing the pushbutton in a locked condition.

To lock the pushbutton 42, with reference to FIGS. 10 and 11, the pushbutton 42 is rotated relative to the body 40 to move the blocking rib 50 away form the position where the blocking rib 50 aligns with the guiding channel 62. Consequently, the blocking rib 50 will face and abut the blocking segment 60 on the end of the body 40. With the abutment between the blocking rib 50 and the blocking segment 60, the pushbutton 42 is not pushable and is locked. Accordingly, the working element will not extend out of the body 40 unintentionally to dirty or damage other objects.

In addition, with reference to FIGS. 8 to 10, the pushbutton 42 has a positioning segment 52 axially formed on and protruding from an end of the pushbutton 42 and having a thickness smaller than that of the pushbutton 42. At least one positioning rib 54 is formed on the outer surface of the positioning segment 52. The body 40 has at least one positioning groove 64 formed in the inner surface of the body 40 and selectively and respectively engaging the at least one positioning rib 54. Preferably, the number of the positioning rib 54, the guiding channel 62 and the positioning groove 64 is one, respectively. Furthermore, the body 40 may further have a positioning channel 66 formed in the inner surface of the body 40 and selectively engaging the positioning rib 54. The positioning groove 64 is spaced from the positioning channel 66 at 90° in curvature. Accordingly, with the engagement of the positioning rib 54 with the positioning channel 66 or the positioning groove 64, a force is necessary to disengage the positioning rib 54 from the positioning channel 66 or the positioning groove 64 for rotating the pushbutton 42 relative to the body 40. Otherwise, the pushbutton 42 cannot be rotated relative to the body 40 arbitrarily.

When the pushbutton 42 is in the unlocked condition where the blocking rib 50 aligns with the guiding channel 62, the positioning rib 54 engages the positioning channel 66. With the engagement between the positioning rib 54 and the positioning channel 66, the pushbutton 42 can be held in the unlocked condition. When the pushbutton 42 is rotated by a predetermined angle to lock the pushbutton 42, such as 90° as aforementioned, the positioning rib 54 engages the positioning groove 64. With the engagement between the positioning rib 54 and the positioning groove 64, the pushbutton 42 can be held in the locked condition. Accordingly, the pushbutton 42 is kept from rotating relative to the body 40 arbitrarily, such that the conditions of the pushbutton 42 will not be changed unintentionally. Moreover, because the positioning segment 52 has a thickness smaller than that of the pushbutton 42, a compressible elasticity is provided to the positioning segment 52 relative to the pushbutton 42. Thus, the positioning rib 54 on the positioning segment 52 can engage and disengage from the positioning groove 64 or the positioning channel 66 conveniently.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stationery tool comprising:
a body having an end;
a pushbutton pushably and rotatably mounted on the end of the body;
a working element mounted in the body and connected to and driven by the pushbutton; and
a push-proof device mounted between the body and the pushbutton and comprising
a blocking protrusion disposed on the pushbutton; and
a blocking segment disposed on the body, selectively abutting the blocking protrusion and having a passage defined in the blocking segment to allow the blocking protrusion to pass.

2. The stationery tool as claimed in claim 1, wherein the blocking protrusion comprises at least one blocking tab axially formed on and protruding from the pushbutton at an end that extends into the body.

3. The stationery tool as claimed in claim 2, wherein the blocking protrusion has two blocking tabs; and
the passage comprises two guiding channels defined through the blocking segment and selectively aligning respectively with the blocking tabs.

4. The stationery tool as claimed in claim 3, wherein each blocking tab has a positioning rib formed on an outer surface of the blocking tab; and
the body has two positioning grooves formed in an inner surface of the body at positions beside the passage and selectively and respectively engaging the positioning ribs on the blocking tabs.

5. The stationery tool as claimed in claim 4, wherein the blocking tabs are formed respectively on two ends of a diameter of the pushbutton; and
the two guiding channels are spaced from each other at 180° in curvature.

6. The stationery tool as claimed in claim 5, wherein the two positioning grooves are spaced from each other at 180° in curvature; and
each positioning groove is spaced from an adjacent one of the guiding channels at 90° in curvature.

7. The stationery tool as claimed in claim 6, wherein the body further has two positioning channels formed in the inner surface of the body and respectively aligning and communicating with the guiding channels; and
the positioning ribs on the blocking tabs respectively engage the positioning channels when the blocking tabs respectively align with the guiding channels.

8. The stationery tool as claimed in claim 7, wherein the blocking segment is formed on the inner surface of the body and comprises a blocking flange being perpendicular to the inner surface of the body.

9. The stationery tool as claimed in claim 2, wherein each one of the at least one blocking tab has a positioning rib formed on an outer surface of the blocking tab;
the passage comprises at least one guiding channel defined through the blocking segment and selectively aligning respectively with the at least one blocking tab; and
the body has at least one positioning groove formed in an inner surface of the body at a position beside the passage and selectively and respectively engaging the positioning rib on the at least one blocking tab.

10. The stationery tool as claimed in claim 9, wherein the body further has at least one positioning channel formed in the inner surface of the body and respectively aligning and communicating with the at least one guiding channel; and
the positioning rib on the at least one blocking tab respectively engage the at least one positioning channel when the at least one blocking tab respectively aligns with the at least one guiding channel.

11. The stationery tool as claimed in claim 10, wherein the blocking segment is formed on the inner surface of the body and comprises a blocking flange being perpendicular to the inner surface of the body.

12. The stationery tool as claimed in claim 1, wherein the blocking segment is formed on the inner surface of the body and comprises a blocking flange being perpendicular to the inner surface of the body.

13. The stationery tool as claimed in claim 1, wherein the blocking protrusion comprises at least one blocking rib formed on and protruding from an outer surface of the pushbutton; and
the blocking segment is formed on the end of the body.

14. The stationery tool as claimed in claim 13, wherein the passage comprises at least one guiding channel axially defined in the end of and extending inside the body and selectively aligning respectively with the at least one blocking rib.

15. The stationery tool as claimed in claim 14, wherein the pushbutton has a positioning segment formed on and protruding from an end of the pushbutton and having a thickness smaller than that of the pushbutton;
at least one positioning rib is formed on an outer surface of the positioning segment; and
the body has at least one positioning groove formed in an inner surface of the body and selectively and respectively engaging the at least one positioning rib.

16. The stationery tool as claimed in claim 15, wherein
one positioning rib is implemented on the pushbutton;
one positioning groove is implemented in the inner surface of the body;
the passage has one guiding channel; and
the body further has a positioning channel formed in the inner surface of the body and selectively engaging the positioning rib.

17. The stationery tool as claimed in claim 16, wherein the positioning groove is spaced from the positioning channel at 90° in curvature.

18. The stationery tool as claimed in claim 17, wherein the stationery tool is a thin film dispenser.

19. The stationery tool as claimed in claim 13, wherein the stationery tool is a thin film dispenser.

20. The stationery tool as claimed in claim 1, wherein the stationery tool is a thin film dispenser.

* * * * *